United States Patent [19]
Miller

[11] Patent Number: 5,181,474
[45] Date of Patent: Jan. 26, 1993

[54] WOOD CHIP RAILWAY CAR CONSTRUCTED BY CONVERTING A STANDARD BOX CAR AND METHOD OF CONVERSION

[76] Inventor: Roy W. Miller, 2540 Clough St., Highland, Ind. 46322

[21] Appl. No.: 692,950

[22] Filed: Apr. 29, 1991

[51] Int. Cl.⁵ .................. B61D 17/04; B61D 17/06; B61D 39/00
[52] U.S. Cl. .................................. 105/355; 105/377; 105/379; 105/406.1; 105/406.2; 105/418; 105/421; 296/56
[58] Field of Search ............. 105/238.1, 370, 377, 105/379, 404, 406.1, 406.2, 411, 418, 421, 280, 261.2; 296/56, 98, 100

[56] References Cited

U.S. PATENT DOCUMENTS

| | | | |
|---|---|---|---|
| 811,717 | 2/1906 | Hart et al. | 105/379 X |
| 884,091 | 4/1908 | Johnson | 105/261.2 X |
| 1,869,029 | 7/1932 | Spiller et al. | 105/406.1 X |
| 1,962,717 | 6/1934 | Kiesel, Jr. | 105/406.1 |
| 2,167,427 | 7/1939 | Tatum | 105/406.2 |
| 2,648,294 | 8/1953 | Sheehan et al. | 105/421 |
| 3,481,371 | 12/1969 | Row | 296/100 X |
| 4,068,769 | 1/1978 | Sweet et al. | 296/56 X |

*Primary Examiner*—Douglas C. Butler
*Assistant Examiner*—S. Joseph Morano
*Attorney, Agent, or Firm*—Myers & Associates, Ltd.

[57] ABSTRACT

A gondola rail car for hauling wood chips and the like having a pair of side walls, an end wall, a floor, an open end and an open top. A door assembly is pivotally mounted for swinging movement adjacent the open end. A ledge is provided to enhance access by an unloading vehicle. The car may be constructed from an existing box car.

19 Claims, 5 Drawing Sheets

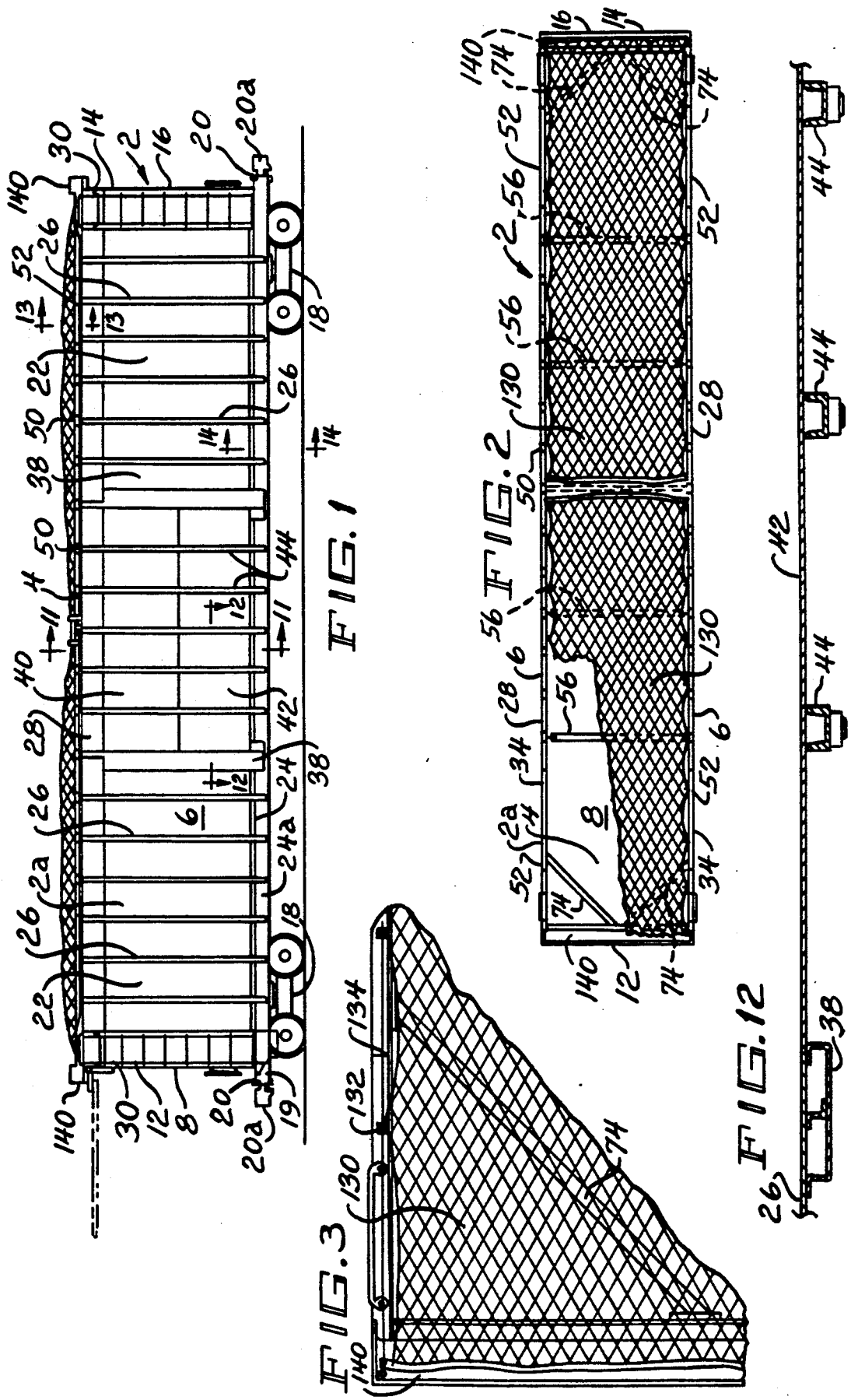

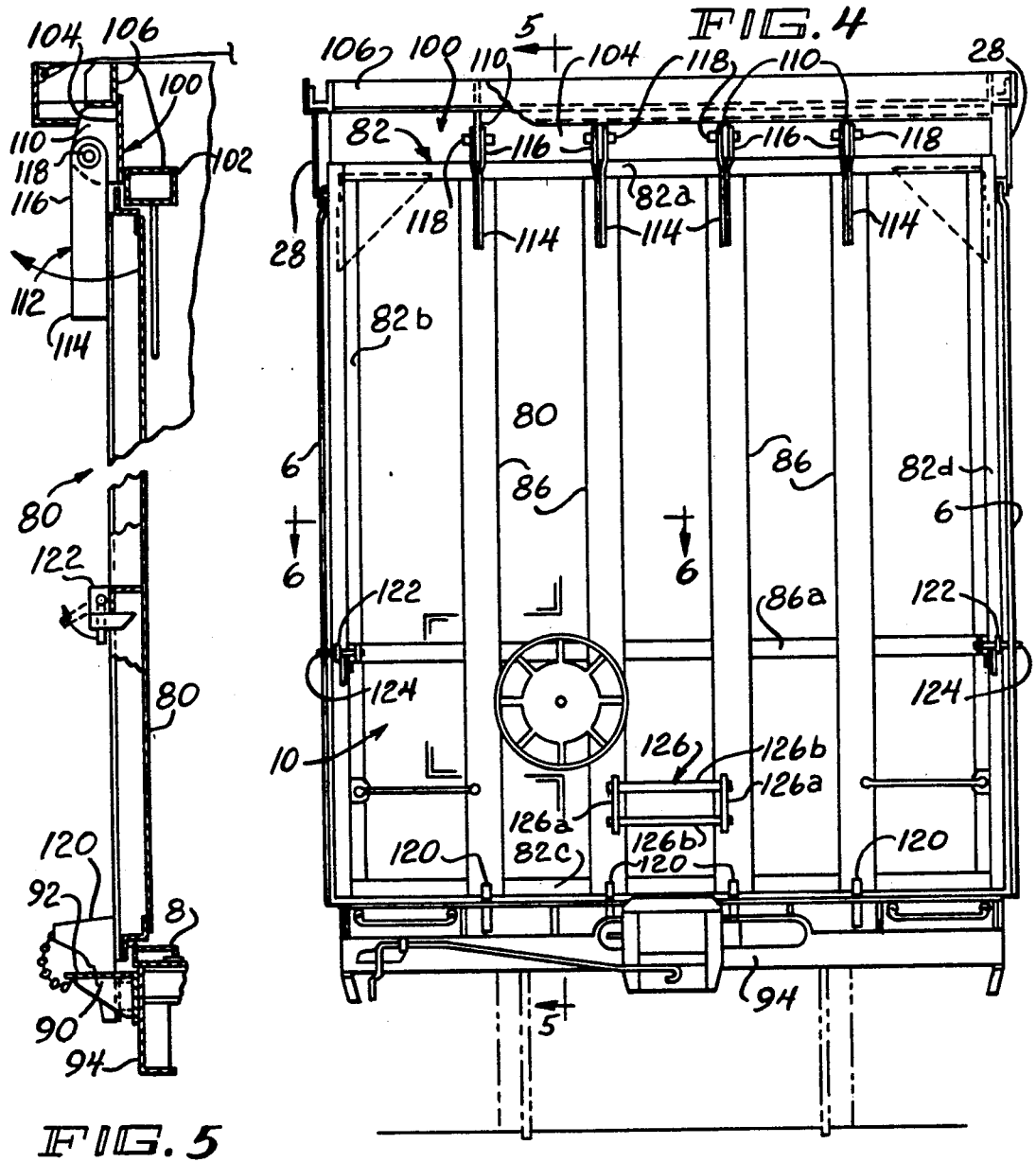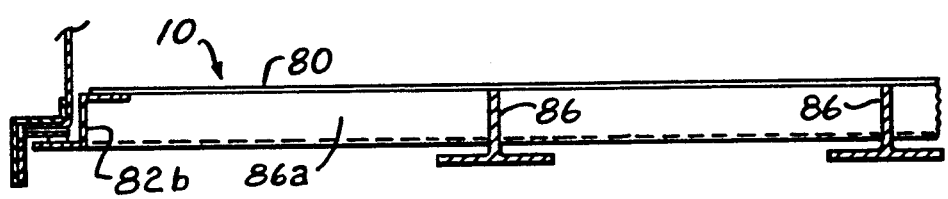

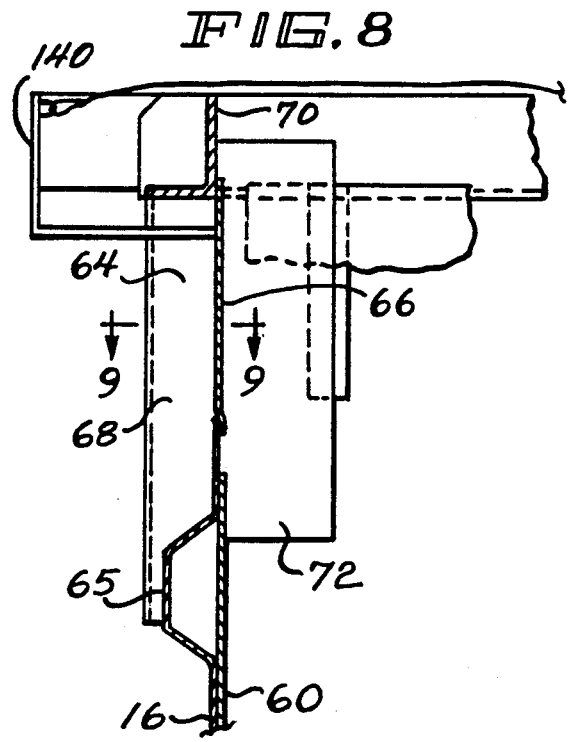
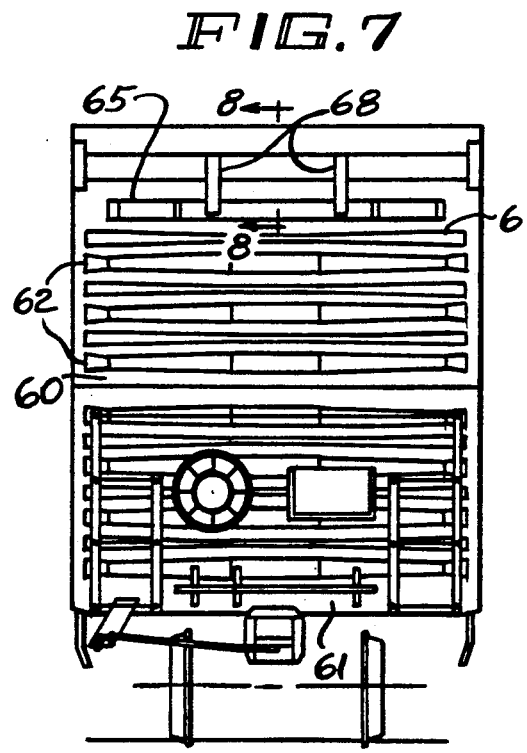
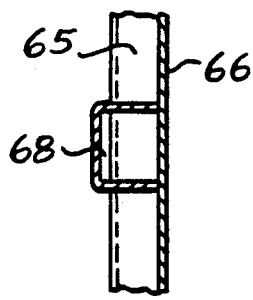
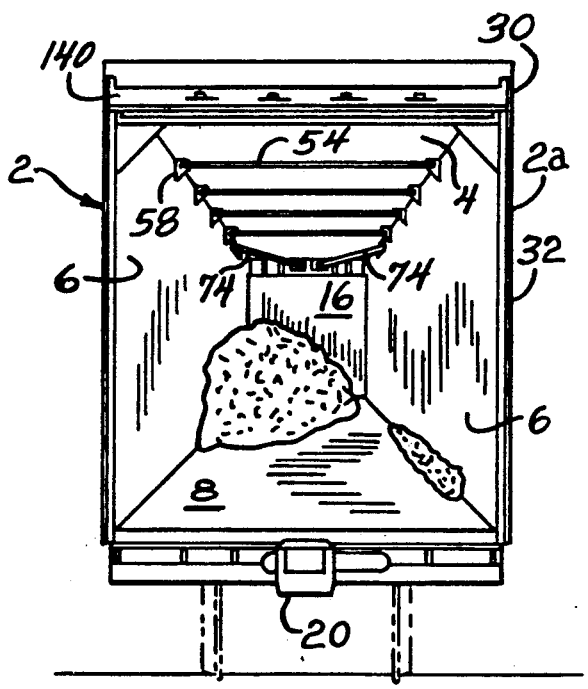

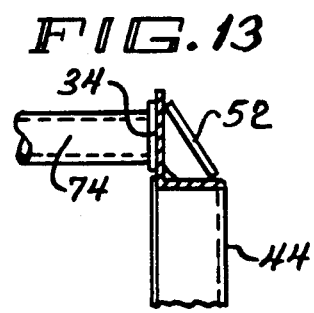
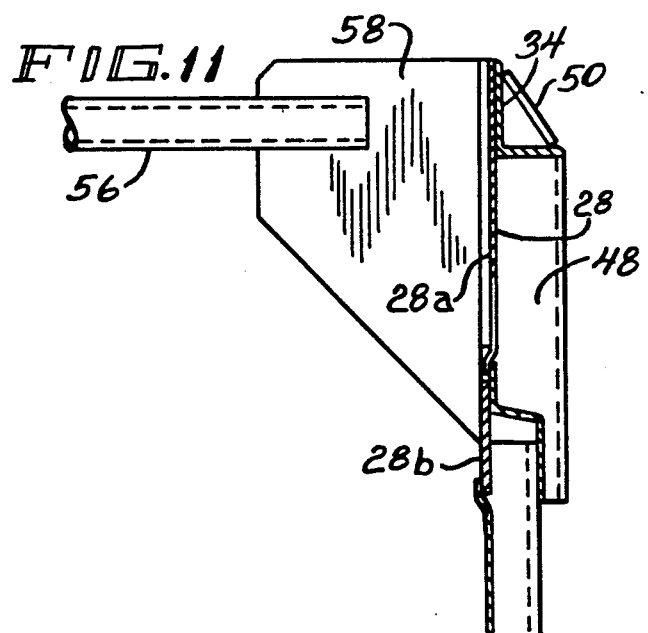
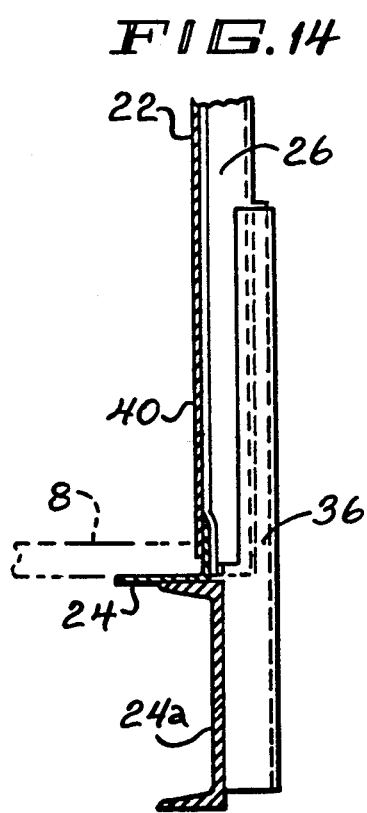
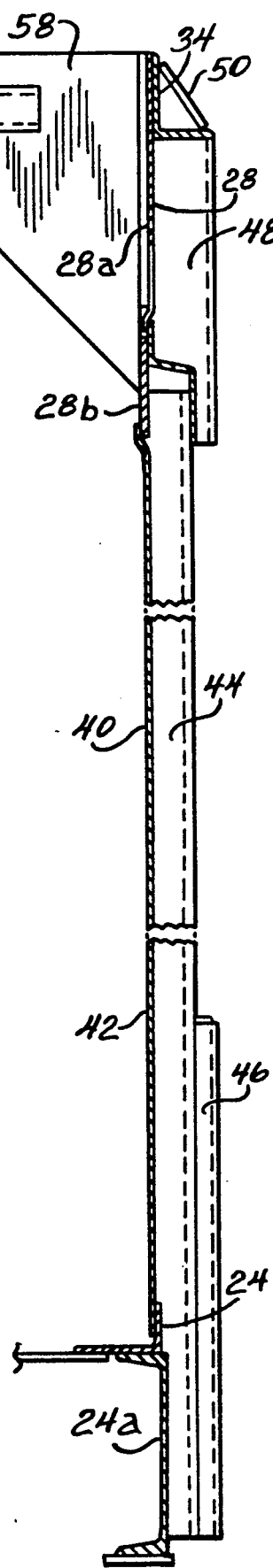

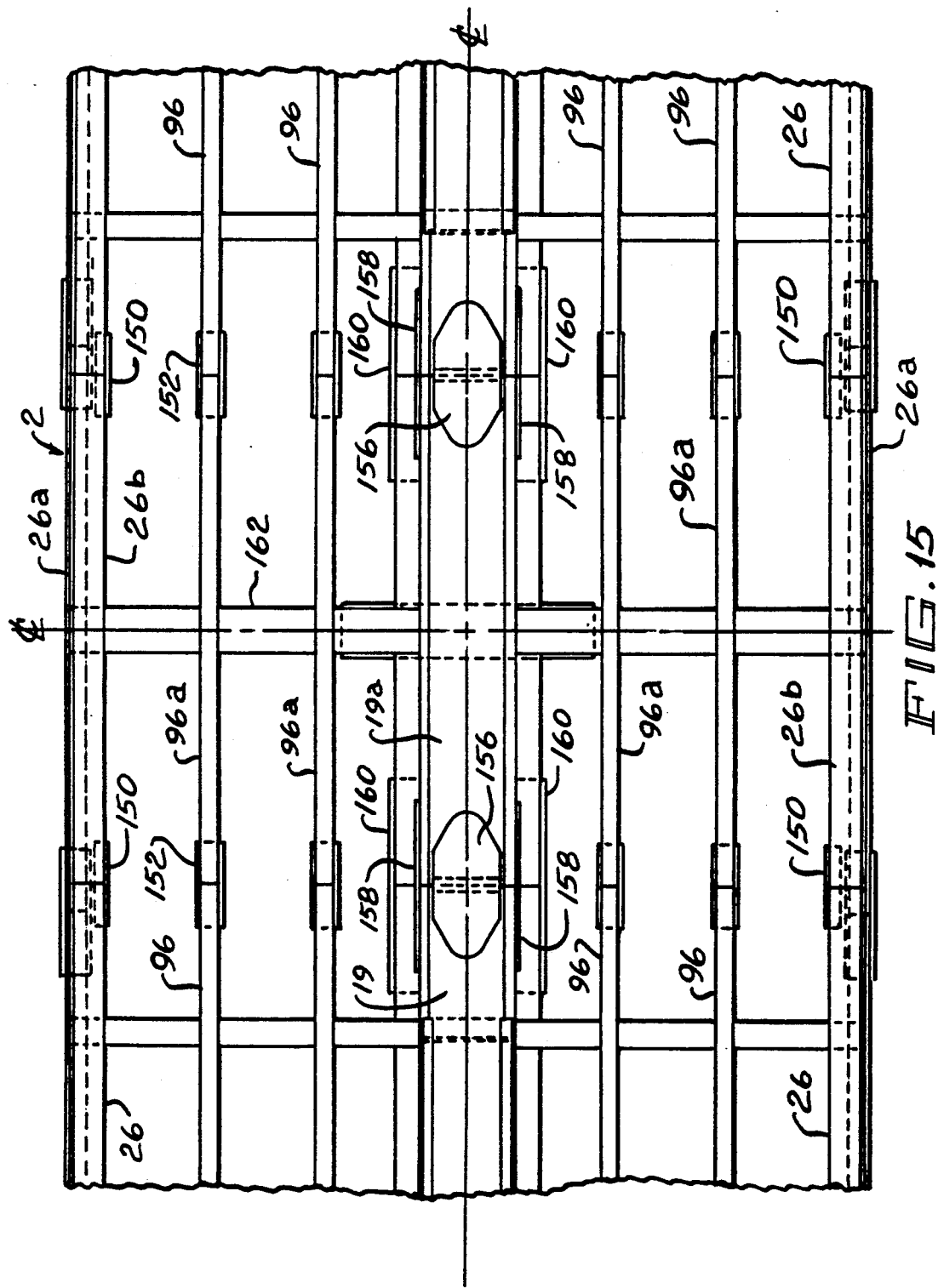

WOOD CHIP RAILWAY CAR CONSTRUCTED BY CONVERTING A STANDARD BOX CAR AND METHOD OF CONVERSION

BACKGROUND OF THE INVENTION

1. Field of the Invention

This invention relates to rail cars and more specifically, to an improved rail car for transporting wood chips and other bulk material, and to a converted box car and method for converting a conventional box car to a wood chip gondola car.

2. Summary of the Prior Art

Wood chips are conventionally transported by rail car or truck trailer from a site having equipment for reducing trees to chip form to remote collection points at pulp mills and the like. Wood chips are a particularly difficult material to load and unload due to their unique physical characteristics. The surface friction of the chips as well the shape of pieces, which tend to interlock with each other, causes the bulk material to adhere together in mass and hinder handling and unloading through use of conventional commodity carrying cars, such as hoppers and gondolas. In fact, the industry prefers to unload wood chips from trailers and rail cars by scoop bearing tractors due to the characteristics of the wood chips and in some instances, due to the adverse climate conditions under which the equipment is operated.

Wood chips are dispensed at the tree felling site from equipment that blows the material into the rail car or trailer. An example of a prior technique of handling wood chips is disclosed in U.S. Pat. No. 3,866,769 to Morey et al directed to a technique for removing wood chips from a trailer for deposit into a pile. Among several shortcomings the foregoing system of the Morey et al patent is not suitable for use with large wood chip dispensers that blow the material into a rail car from above. Prior rail cars for hauling wood chips have also not been highly satisfactory from the standpoint of providing economical and effective equipment for receiving the commodity at the loading port, transporting the material to collection sites, and unloading the wood chips from the rail car.

In addition, because of changes in the freight industry, many box cars, formerly in service, now lie idle and out of operation. The basic design of a box car renders it unsuitable for operation for hauling wood chips in present needs. It is therefore extremely desirable for reasons of economy that such idle equipment be capable of being converted into a useful rail car, such as for transporting wood chips.

SUMMARY OF THE INVENTION

It is therefore an objective of the present invention to provide an improved gondola car for wood chips and a technique for producing such wood chip cars from existing box cars. The wood chip rail car herein disclosed is economical to manufacture and provides for efficient loading, transport and unloading. The rail car of the invention is constructed with an open top for receiving wood chips from a loading spout. The open top is equipped with an improved netting arrangement for effective retention of the load during transport. The wood chips are unloaded from the rail car of the application through an end door assembly. The end of the car adjacent to the door assembly includes means to engage the bridge plates of the unloading platform for smooth operation of a tractor back and forth during movement in and out of the rail car during unloading. The door assembly is pivotally mounted from above and can be opened out of way of the unloading tractor. The improved wood chip rail car of the invention can economically be manufactured from existing box cars. Such a capability permits the utilization of idle box cars as well as providing the beneficial reduction of the overall cost of manufacture of wood chip rail cars.

BRIEF DESCRIPTION OF DRAWINGS

FIG. 1 is a side elevational view of wood chip rail car of the invention;

FIG. 2 is a top plan view, with parts cut away, of the rail car of FIG. 1;

FIG. 3 is an enlarged plan view of corner details, of the rail car of FIG. 1;

FIG. 4 is an end elevational view of the rail car of FIG. 1 showing the unloading door;

FIG. 5 is a side elevational view, with parts in section, taken along line 5—5 of FIG. 4;

FIG. 6 is a partial plan view, with parts taken along line 6—6 of FIG. 4;

FIG. 7 is an end elevational view of rail car of FIG. 1 taken from the opposite end of the rail car from the view of FIG. 4;

FIG. 8 is a partial side view, with parts in section, taken along lines 8—8 of FIG. 7;

FIG. 9 is a partial top plan view, with parts in section, taken along lines 9—9 of FIG. 8;

FIG. 10 is an end perspective view of rail car of FIG. 1 showing a partial load with the unloading door in a raised, open position.

FIG. 11 is a elevational end view, with parts in section, taken along lines 11—11 of FIG. 1;

FIG. 12 is partial top plan view, with parts in section, taken along lines 12—12 of FIG. 1, FIG. 13 is a partial end elevational view, with parts in section, taken along lines 13—13 of FIG. 1, and FIG. 14 is a partial end elevational view, with parts in section, taken along lines 14—14 of FIG. 1, and FIG. 15 is a partial top plan view of details of the frame below the floor at the center of the rail car of FIG. 1.

DESCRIPTION OF A PREFERRED EMBODIMENT

Referring now to FIGS. 1-10, there is illustrated the improved gondola car of the invention, generally designated by reference numeral 2, for transporting wood chips and other particulate material. Although it is within the scope of the invention to manufacture the rail car 2 as new equipment, the rail car 2 is shown in FIGS. 1—10 as being constructed from a box car of known design prior to conversion. The rail car 2 is provided with a body 2a having an open top 4 for loading, a pair of side wall assemblies 6, and a floor 8. A door assembly 10 for unloading is pivotally mounted at an open end 12 of body 2a, while the opposite car end 14 is closed by an end wall assembly 16. Body 2a is carried on a pair of truck assemblies 18 of conventional design. A longitudinally extending center sill 19 is mounted beneath floor 8 and is connected to striker plates 20 and couplers 20a at each end as shown in FIGS. 1, 7, and 10.

As seen in FIGS. 1, 2, 11, and 14, the side wall assemblies 6 include side wall panels 22 as normally provided on a box car. The side wall panels 22 are affixed at their bottom to longitudinally extending L-shaped stringers or side sills 24. The side sills 24 are mounted on longitudinal channel members or sub side sills 24a. The side wall panels 22 are reinforced by a plurality of vertical side posts 26 that are welded to side sills 24 and extend upward to a side extension weldment 28 on each side wall assembly 6. The side extension weldment assembly 28 includes extension side sheets 28a (FIG. 11) and is affixed to extension members 30 projecting from corner posts 32. Upper members 34 in the form of angle members extend along the top of the side extension weldments 28 as seen in FIGS. 11 and 13 to strengthen the frame adjacent upper opening 4. Each of the side posts 26 are reinforced at their bottom by welded extension channels 36 that are welded to sub side sill channel member 24a as best seen in FIG. 14.

Referring to FIGS. 1, 11 and 12, a pair of vertical posts 38, having a generally U-shaped configuration, are mounted on both sides of body 2a. The posts 38 served as the door supports of the box car from which rail car 2 is converted. A pair of upper and lower door closure sheets 40 and 42 are welded at their ends to posts 38. The door closure sheets 40 and 42 are reinforced by five vertical posts 44 of similar design as posts 26. The posts 44, which are strengthened by channels 46 (FIG. 11), are welded at their bottom to the sub side sills 24a and extend upward in attached relationship to side plate member 28b as seen in FIG. 11.

The side extension weldments 28 are each reinforced by a plurality of U-shaped members 48 which are disposed between the top of side plate 28b and the bottom of longitudinal angle 34. A plurality of plates 50 are angularly mounted in fixed relation to upper channel members 34 in line with post extensions 48 as seen in FIGS. 1, 2 and 11. A pair of angle plates 52 are also affixed to angle members 34 on each side of body 2a as reinforcement for car rollover clamping mechanism as further shown in FIG. 1, 2 and 13. As illustrated in FIGS. 2 and 11, a plurality of cross-tie braces 56 extend between opposed side extension weldments 28 and are welded at each end to respective plates 58. The plates 58 are affixed to the inner surface of upper side extension weldments 28. In FIG. 2 five cross-tie braces 56 are shown, but other numbers of these members may be used if desired. The cross-tie braces 56 act to increase the rigidity of the side wall assemblies 6 and tie the side wall assemblies 22 together as well as increase the overall strength of the rail car As seen in FIGS. 7, 8, 9 and 10, the closed end wall assembly 16 includes an end panel assembly 60 that is affixed to corner posts 32 above a reinforced end sill structure 61. The end panel assembly 60 is strengthened by a plurality of vertically spaced, horizontal braces 62 of a conventional design. An end wall extension weldment 64 is attached to a horizontal channel member 65 adjacent to the top of end panel assembly 60 an includes an end sheet 66, a pair of exterior reinforcing channels 68, and a upper angle member 70 extending between the longitudinal angle members 34. Diagonal braces 74 are positioned between the end extension weldment 64 and the side wall assemblies 6 at each corner of both ends 12 and 14 of the rail car.

The door assembly 10 located at the unloading end 12 of the rail car 2 is best illustrated in FIGS. 4–6. The door assembly 10 is formed by a reinforced door sheet 80 that substantially covers the entire end of the rail car and is strengthened by a four-sided frame 82 composed of frame members 82a, b, c, and d having a Z-shaped cross sectional configuration. Four vertical T-sections 86 are welded to the outer surface of door sheet 80 and are further welded at each end to opposed frame members 84a, 84c. Beneath the door sheet 80, an angle assembly 90 having a projecting horizontal ledge 92 that acts as a landing surface is affixed to end sill 94 and lies in a plane slightly below the plane of the floor 8. As seen in FIG. 5, the end sill 94 is affixed to the frame on the ends of a plurality of floor stringers 96 in the form of I-beams extending the length of the car to the sub-sills 24a at the unloading end 12.

As seen in FIGS. 4 and 5 the door assembly 10 is supported on a header and end vertical extension weldment 100 comprising cross box beam 102, extension sheet 104, and a lateral angle top chord 106 extending between horizontal angles 34. A plurality of hinge mounting plates 110 are affixed to the box beam 102 and to the angle 106. A door hinge plate weldment 112 in the form of a pair of welded plates 114 having spaced ends 116 are welded to each of the T-sections 86. The spaced ends 116 embrace mounting plates 110 for pivotal attachment by means of hinge pins 118. As should be apparent from the foregoing, the door assembly 10 is arranged to be opened from its closed position in a vertical plane by being swung upward to a position above the end door opening. The door assembly 10 is locked in a closed position by removable lock dogs 120 arranged to project through holes in the horizontal ledge 92 of lower angle member 90. Locking is also accomplished by lock pin assemblies 122 having lock pin elements 124 that are mounted on both sides of the door assembly 10 to engage holes (not shown) in the corner posts. A door handle assembly 126 comprising spaced plates 126a and shafts 126b is welded to the inner two T-sections 86. A plurality of cross reinforcing angles 86a extend in aligned relationship between T-sections 86.

As illustrated in FIGS. 1–3, a pair of nets 130 of a suitable material are selectively stretched over the open top 4 of the rail car 2. The nets 130 have tab portions 132 that are retained by cables 134 extending along both sides of the rail car 2. The two nets 130 are pulled back to opposite ends 12 and 14 of the rail car when wood chips or other particulate material are to be loaded through open top 8. The pulled back nets 130 are stored in an open trough 140 respectively attached to the end extension weldment 64 and end and door header extension weldment 100. The troughs 140 form a basket for storing the nets 130 while not covering the top of the rail car 2. After the wood chips are loaded to the top of the body 2a, an individual can walk along the top of wood chips and pull both nets 130 from troughs 140 to stretch the netting over the loaded material to prevent the chips from being discharged during transport.

In the loading operation with the nets 130 retracted, the a body 2a is generally filled with wood chips or other particulate material through open top 4 from an overhead spout (not shown) that swings back and forth along the length of the car. After the car is filled, personnel can selectively pull the nets 130 from the end baskets 140 by walking along the top of the load and stretch the nets 130 over the wood chips.

In the unloading mode, a hydraulically operated mechanical arm (not shown) lifts or swings the door assembly 10 upward by engaging door handle assembly 126. Conventional bridge plates (not shown) are lowered from the unloading dock into contact with the landing surface of ledge 92 projecting from end sill 94. The engagement of the bridge plates on ledge 92 creates a bridge permitting unhindered movement of a tractor (not shown) back and forth from the dock into the body 2a. The tractor normally is provided with a scoop or bucket. The tractor moves into the rail car, fills the bucket with material, and backs up out of the car to dump the extracted load onto a conveyor bucket. It takes a number of operations of the tractor to completely unload the wood chips. As should be apparent, the raised, open position of the door assembly 10 does not interfere with the unloading movement of the tractor.

In converting a standard box car into the construction of the rail car 2 of the invention, the roof, the side doors and one end wall of the box car are removed. As seen in FIG. 15, the frame of the original box car being converted is lengthened by cutting in half the opposite side sills 26, the longitudinal floor stringers 96, the box center sill 19 and any associated frame components (not shown). Matching extensions pieces, including side sill extensions 26b, floor stringer extensions 96a, and center sill extension 19a are interposed between the cut sections and are respectively welded to form a continuous stretched frame. The side sill extensions 26b are affixed by a pair of side sill angle splice plates 150 on each side. The stringer extensions 96a are formed into a unitary structure with the split stringers 96 by splice plates 152. The center sill extension 19a is affixed to center sill 19 by welding using top splice plate 156, side splice plates 158 and flange splices 160. An additional crossbearer 162 is added in connected relationship between the side sill extensions 26b, center sill extension 19a and the stringer extensions 96. Floor panels and the sub-sills 26a are added to the lengthened frame. The foregoing extension components may lengthen the converted box car by any suitable amount, such as, for example, six feet. The volumetric capacity of the box car as converted is significantly increased as compared to the original box car.

The reinforced door closure sheets 40 and 42 are then affixed between door posts 38 to close the box car door openings that have been lengthened by the frame extensions. The corner post extension members 30, upper side extension weldments 28, end wall extension weldment 64, and header and end wall extension 100 are also all welded into place. The foregoing combined upper extension structure serves to strengthen the modified box car body and also increases the overall load capacity of the converted box car as well as a result of the added length as previously described. The door assembly 10, end sill 94, angle assembly 90 and related end assembly parts are further affixed in position by known techniques. The box car as converted is further reinforced by the posts, channel members, braces, plates, and other elements as previously described.

What is claimed is:

1. An open top rail car for hauling particulate material comprising
   a body being carried by a pair of truck assemblies and having a pair of opposed sidewalls, an end wall, a floor and an open end,
   door means being pivotally mounted on said body at an upper portion and closing said open end in a closed position,
   said door means being swingable from said closed position to a raised position for opening said open end for unloading,
   said body having an open top for receiving a load to be transported,
   said body includes an end sill mounted beneath said door means,
   said end sill having a flat horizontal projecting ledge for engaging a bridge element for an unloading vehicle.
   hinge means affixed to said body and being pivotally connected to said door means at an upper portion of said door means,
   said hinge means includes a plurality of hinges having a respective hinge pin, said hinge pins being disposed along a common horizontal axis for mounting said door means for swinging movement,
   said hinge means is attached to a header means positioned above said door means,
   net means operatively connected to said body adjacent said open top, said net means being arranged to selectively cover said open top,
   trough means provided adjacent said wall and said open end, said trough means for storing said net means, and
   lock means for selectively engaging said projecting ledge and said door means for locking said door means in a closed position.

2. The rail car according to claim 1 wherein said end sill includes an angle member having a horizontal portion forming said ledge.

3. The rail car according to claim 1 wherein said door means includes a closure panel,
   said closure panel being mounted on a four sided frame, a plurality of reinforcing channel members being affixed to said closure panel.

4. The rail car according to claim 1 wherein said header means extends between said open opposed sidewalls.

5. The rail car according to claim 1 wherein said body includes a longitudinal channel member extending along the top of each of said opposed side walls, a pair of lateral channel members respectively extending between said opposed side walls above said open end and said end wall.

6. The rail car of claim 1 further comprising a plurality of braces extending between said opposed sidewalls.

7. The rail car of claim 1 wherein said net means includes a pair of nets respectively adapted to be stored in said trough means, a cable means connected to said body and extending along said open top, said nets each having means for attaching said nets to said cable means.

8. A rail car for carrying particulate material constructed from a box car having side walls with door openings comprising
   a box car body carried on a pair of truck assemblies and having a pair of opposed sidewalls, an end wall, an open end and an open top, said box car body further having door openings in at least one of said pair of side walls,
   said side walls having closure means permanently affixed to said side walls for the enclosing the door openings of the box car,
   a door assembly being pivotally affixed at its top portion to selectively close and open said open end,
   a plurality of vertical extension members mounted on the top of said side walls, on the top of said end wall and above said open end, a plurality of extension side sheets being affixed to said plurality of vertical extension members for increasing the height of said body for increased load capacity, and
said door assembly being affixed to at least one of said extension members.

9. The car according to claim 8 further including a horizontal ledge extending beneath said door assembly.

10. The converted box car according to claim 9 further including a plurality of braces for strengthening said body adjacent said open top.

11. The car according to claim 8 wherein said box car body includes a floor frame having a continuous center sill cut into two sections and a pair of opposite side sills cut into two sections, said center sill having a center sill extension affixed in end to end relation between said center sill sections for lengthening said box car body, said pair of opposite side sills having a respective side sill extension affixed in end to end relation between said side sill sections.

12. The car according to claim 11 wherein said center sill extension and said side sill extensions are affixed by respective splice plates.

13. The sill according to claim 8 further comprising an end sill affixed to said box car body beneath said door assembly.

14. A converted box car for carrying particulate material comprising
a box car body carried on a pair of truck assemblies and having a pair of apposed sidewalls, an end wall, an open end and an open top, said box car body further having door openings in one of said pair of side walls,
said box car having closure means permanently affixed to the said door openings of the box car,
a door assembly being pivotally affixed at its top portion to selectively close and open said open end,
a plurality of vertical extension members mounted on the top of said side walls and said end wall, a plurality of extension side sheets being affixed to said plurality of vertical extension members for increasing the height of said body for increased load capacity,
said box car body includes a floor frame having a continuous center sill cut into two sections and a pair of opposite side sills cut into two sections,
said center sill having a center sill extension affixed in end to end relation between said center sill sections for lengthening said box car body, and
said pair of opposite side sills having a respective side sill extension affixed in end to end relation between said side sill sections.

15. A method for converting a conventional railway box car to an open rail car for transporting particle material comprising the steps of
removing an end wall and roof of the box car to form an open end and open top,
removing the doors provided on the sidewalls of said box car,
affixing permanent closure members to said side walls to cover said door openings after removal of said doors,
mounting a end door on the box car for pivotal movement covering said open end for closing and opening said open for access to particulate material.

16. The method according to claim 15 further comprising the step of mounting vertical sidewall extensions and vertical end walls extensions to the box car for increasing the capacity within the box car.

17. The method according the claim 15 further comprising the steps of affixing a particulate retaining material to said box car for selectively covering said open top.

18. The method according to claim 17 including the step of affixing troughs to the ends of the box car adjacent the open top for storing the retaining material.

19. The method according to claim 15 further comprising the step of lengthening the center sill and side sills of the box car for increasing the length of the cargo space of the converted box car.

* * * * *